R. W. PITTMAN.
APPARATUS FOR DRAWING THE TEMPER FROM PORTIONS OF HARDENED ARTICLES.
APPLICATION FILED MAR. 26, 1918.

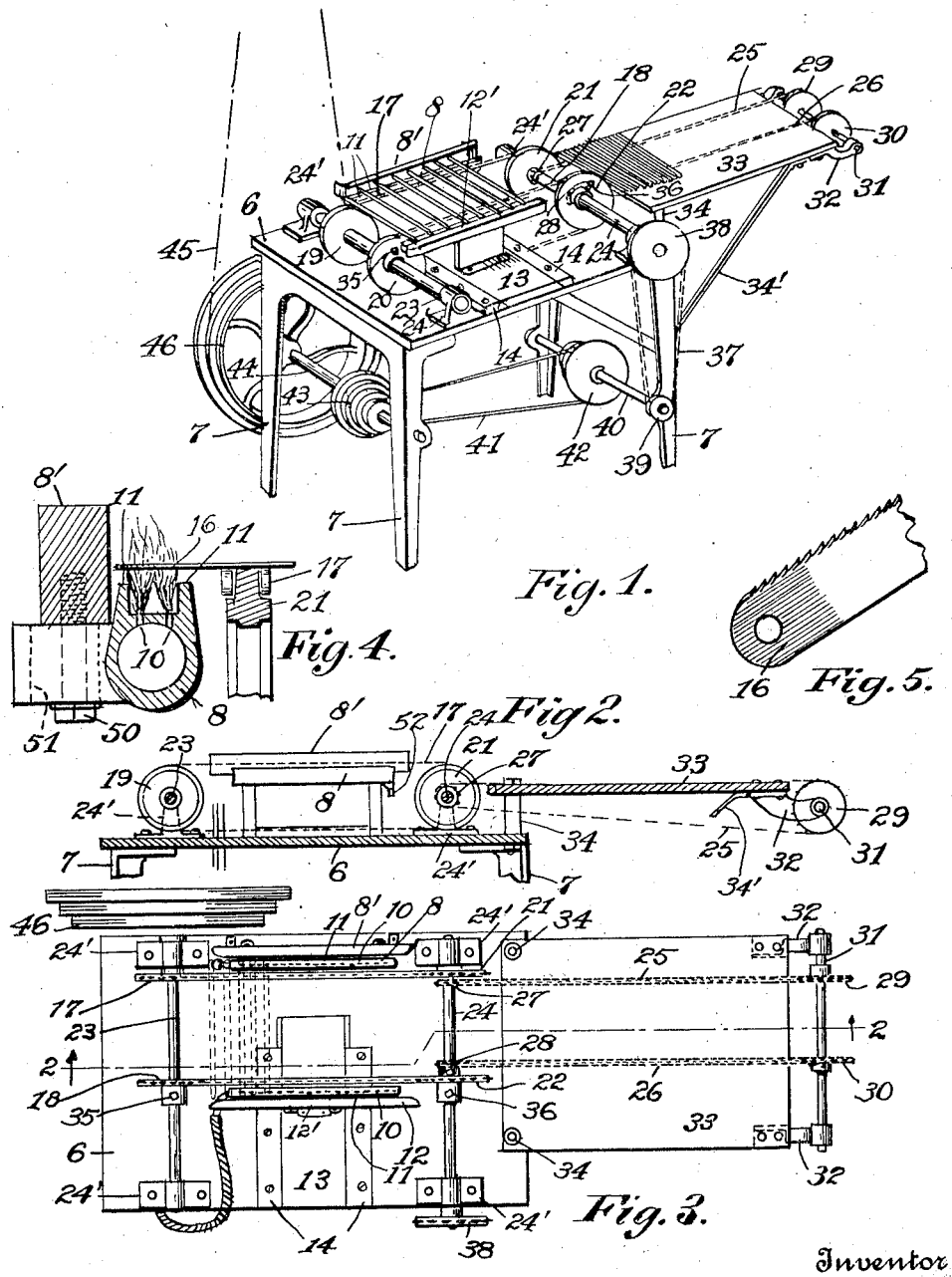

1,362,736.

Patented Dec. 21, 1920
2 SHEETS—SHEET 2.

Inventor
Reinhart W. Pittman
By his Attorney

UNITED STATES PATENT OFFICE.

REINHART W. PITTMAN, OF NEW YORK, N. Y., ASSIGNOR TO THE ALSTON SAW & STEEL COMPANY, OF NEW YORK, N. Y., A CORPORATION OF PENNSYLVANIA.

APPARATUS FOR DRAWING THE TEMPER FROM PORTIONS OF HARDENED ARTICLES.

1,362,736.  Specification of Letters Patent.  Patented Dec. 21, 1920.

Application filed March 26, 1918. Serial No. 224,731.

*To all whom it may concern:*

Be it known that I, REINHART W. PITTMAN, a citizen of the United States, and a resident of the borough of Manhattan, in the city, county, and State of New York, have invented certain new and useful Apparatus for Drawing the Temper from Portions of Hardened Articles, of which the following is a specification.

This invention relates to apparatus for drawing the temper from a portion of hardened or tempered articles, and relates particularly to the drawing of the temper from the ends or portions of hardened hack saw blades whereby they are secured in a carrying frame.

In the manufacture of hack saw blades in order that such blades will operate efficiently in the cutting of metal they are hardened. In the hardening operation the entire blade is hardened with the result that as the blade is secured in a carrying frame therefor when the blade is to be used, usually by a clamping arrangement having a part to pass through an opening at the ends of the blades, such blades are fractured or broken. In order to make the blades pliable at the ends and prevent the breaking of the same as they are secured in their carrying frame the temper is drawn from the ends of the blades by subjecting them to a heat treatment, and it is the object of the present invention to provide apparatus including a heating arrangement and means to continuously convey or feed successive blades to such heating arrangement and the delivering of the same from such arrangement.

It is a further object of the invention to provide an adjustable apparatus of this character to readily adapt the same to treat hack saw blades of different length, width and thickness.

In the drawings accompanying and forming a part of this specification, Figure 1 is a perspective view of an apparatus showing an embodiment of my invention.

Fig. 2 is a sectional side elevation taken on the line 2—2 of Fig. 3 looking in the direction of the arrows with a portion of the standards broken away.

Fig. 3 is a plan view.

Fig. 4 is an enlarged sectional view of the heating arrangement and showing the relation of the end of a hack saw blade thereto as it is fed over the same.

Fig. 5 is a perspective view of the end portion of the blade showing in shaded lines substantially the portion of the blade from which the temper is drawn.

Similar characters of reference designate like parts throughout the different views of the drawings.

Figure 6:
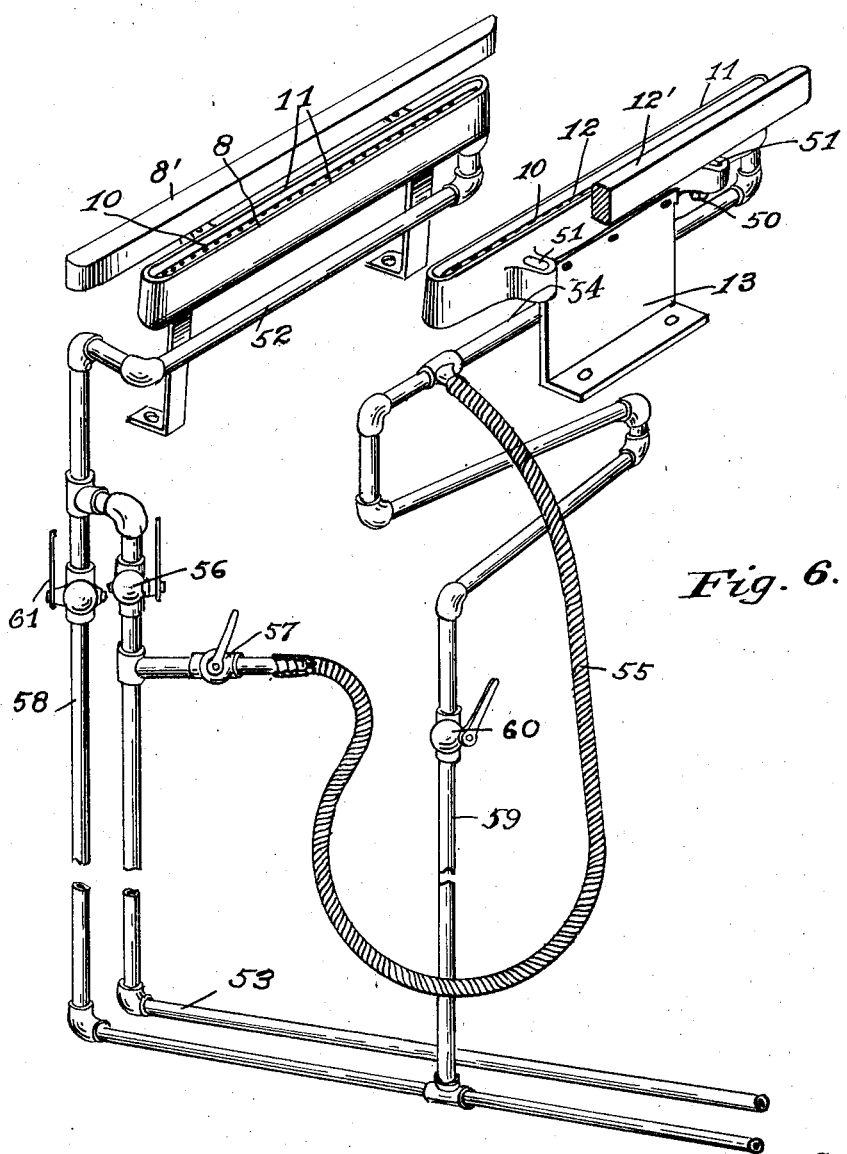
Fig. 6 is a perspective view of a pair of burners for gaseous fuel to be used as the heating device and showing the connection thereof with a source of fuel supply.

The embodiment of my invention shown in the drawings comprises a table 6 supported by legs or standards 7 and upon which table the heating arrangement and blade conveying means is mounted. Fixed upon the table adjacent one side is a gas burner consisting of a tubular member 8 having a series of burner ports 10 in the top extending longitudinally thereof with flanges 11, 11, projecting up from and extending longitudinally of the tubular member 8 at opposite sides of the burner ports. These flanges 11 operate to prevent undue spreading of the flame laterally. A burner 12 similar to the burner 8 is fixed to a head 13 slidably mounted between gibs 14 on the table 6 to extend parallel with the burner 8 and have adjustment toward and away from said burner for a purpose to be hereinafter set forth. The burners 8 and 12 are so spaced from each other that the flame from the ports of the respective burners is directed toward the end portions of a saw blade which are adjacent perforations as shown by the shaded portion 16 in Fig. 5.

The saw blades are successively fed over the burners by means of a conveyer comprising chains 17 and 18 passing over and driven by sprocket wheels 19, 20, 21 and 22 (Fig. 1) mounted respectively on shafts 23 and 24 journaled in hangers 24' secured upon the table 6, the chains being located within burners 8 and 12 as clearly shown in Fig. 3. The blades are fed to the chains 17 and 18 either manually, or automatically by suitable mechanical feeding means, in successive order and in spaced relation so that the blades rest upon the chains at a point within the perforations at the ends of the blades, and the perforated ends of the blades will pass over the burners. To assure the longitudinal positioning of the blades on the conveyer to properly position the blades on the conveyer with relation to the burner guides 8' and 12' are provided at the outer sides of the burners the entering ends of which guides are beveled or curved as shown to facilitate the guiding of the blades between the same.

The blades are fed to and over the burners substantially in the spaced relation as shown in dotted lines in Fig. 3 and are delivered from the conveyer chains 17 and 18 to a second conveyer comprising a pair of sprocket chains 25 and 26 passing over and driven by sprocket wheels 27 and 28 mounted on and rotatable with the shaft 24 and sprocket wheels 29 and 30 mounted on and rotatable with a shaft 31 journaled at its ends in arms 32 fixed to and extending forwardly from a table 33 supported by posts 34 projecting up from the table 6 and a bracket 34' so that the table 33 will extend forwardly of said table 6 in a plane substantially parallel with the upper stretch of the conveyer chains 25 and 26. The conveyer chains 25 and 26 are provided to permit of the cooling of the heated blades. The sprocket wheels 27 and 28 are of less diameter than the sprocket wheels 19, 20, 21 and 22 in order to drive the conveyer chains 25 and 26 slower than the conveyer chains 17 and 18, thereby retarding the movement of the blades and permitting the same to be cooled. From the conveyer chains 25 and 26 the blades may be delivered to a suitable receiving bin or box (not shown). The blades as they are cooling and being moved by the conveyer chains 25 and 26 will lie contiguous to each other and to prevent undue sagging of said chains with the possibility of breakage of the same the table 33 is provided, said table partially supporting the blades as they are being moved by the chains 25 and 26.

To draw the temper of blades of greater length than illustrated the head 13 with the burner 12 and guide 12' are adjusted outward away from the burner 8, and the sprockets carrying the chain 18 are adjusted on the shafts 23 and 24 by loosening set screws 35 and 36 in the hubs of said wheels to secure them to the shafts so that the chain will be contiguous to the burner 12 as shown in Fig. 3. The conveyer chain 26 is adjusted in a like manner by adjusting the sprocket wheels carrying said chain on the shafts 24 and 31.

The conveyers are driven through a chain 37 passing around a sprocket wheel 38 fixed to the shaft 24 and a sprocket wheel 39 fixed to a shaft 40 rotatably supported by the forward table supporting legs 7. The shaft 40 is driven by a belt 41 passing around a pulley 42 on the shaft 40 and a pulley 43 on a shaft 44 rotatably supported in the rear table supporting legs 7. The shaft 44 is driven from a suitable source of power by a belt 45 passing around a pulley 46 fixed to the shaft 44, this latter pulley being a stepped pulley to drive the conveyers at variable speeds.

In order to properly heat and treat blades of different widths and thickness it is necessary that the blades are moved across the burners at different speeds varying with the thickness and width of blade and the necessary time required to heat the same, and that a thin and narrow blade may be moved much faster than a thick and wide blade. The conveyers must therefore be capable of being driven at variable speeds. For this purpose the wheels 42 and 43 are stepped wheels or pulleys, and it will be obvious that by this arrangement the speed of the conveyers may be varied at will.

The guides 8' and 12' are made relatively thick as shown in Fig. 4, whereby these guides not only retain the heat generated by the burning fuel at the burners but also serve to provide a heat zone adjacent the ends of the blades. Furthermore, the thickening of the guides prevents distorting thereof due to the alternate heating and cooling of the same. To permit of the increasing and decreasing the zone of the blade from which the temper is to be drawn depending upon the size of blades being treated, the guides 8' and 12' are adjustable laterally of the burners, which may be accomplished by means of a securing set screw 50 passing through elongated slots 51 in the burner supports.

In Fig. 6 I have shown the heating burners 8 and 12 as consisting of blast burners utilizing gas as fuel, the fixed burner 8 having a fuel inlet pipe 52 connected by piping 53 with the source of gas supply, the inlet pipe 54 of burner 12 also being connected to said piping by a flexible pipe or tubing 55, the flow of gas to the inlet pipes 52 and 54 being regulated by valves 56 and 57. The inlet pipe 52 is connected to an air blast by piping 58, and the inlet pipe 54 for the burner 12 is connected to such blast by a branch pipe 59 having a movable joint connection with the inlet pipe 54 to permit of the adjustment of the burner 12. The air blast through the pipes 58 and 59 is regulated by valves 60 and 61.

Having thus described my invention, I claim:

1. Apparatus for drawing the temper of the ends of hardened saw blades, comprising a pair of longitudinal and spaced burners, means to travel between said burners to convey blades with the ends moving across the burners, a conveyer to which the blades are delivered after they have been moved across the burners, and means to drive the conveyers at variable speeds.

2. In apparatus for drawing the temper of the ends of hardened saw blades, the combination of a pair of parallel and spaced longitudinally extending heating devices; a conveyer to travel between said heating devices to carry the blades with the ends to move across the heating devices; means to longitudinally position and guide the blades relative to the heating devices as they are transported by the conveyer; and a second conveyer to which the blades are delivered from the first conveyer after passing over the heating devices, said second conveyer traveling at a slower speed than the first conveyer for the purpose specified.

3. In apparatus for drawing the temper of the ends of hardened saw blades, the combination of a pair of parallel and spaced longitudinal burners; a conveyer to travel between the burners and move the blades carried thereby across the burners, comprising a pair of rotatable shafts one at each end of the burners, sprocket wheels mounted on and rotatable with the shafts, and chains to pass around said sprocket wheels, said sprocket wheels being located on the shafts so that the chains will come within and adjacent the burners; and a pair of movable chains to which the blades are delivered from the first conveyer; and a table supported to extend in a plane substantially parallel with one stretch of said latter chains, for the purpose specified.

4. In apparatus for drawing the temper of the ends of hardened saw blades, of a conveyer to carry said blades with the ends projecting from opposite sides of the conveyer; and burners at opposite sides of the conveyer across which the ends of the blades are moved by the conveyer, each of said burners comprising a longitudinal tubular member having burner ports with a wall projecting from the tubular member at opposite sides of the ports, for the purpose specified.

5. In apparatus for drawing the temper of the ends of hardened saw blades, of a conveyer to carry said blades with the ends projecting from opposite sides of the conveyer; burners at opposite sides of the conveyer across which the ends of the blades are moved by the conveyer, each of said burners comprising a longitudinal tubular member having burner ports with a wall projecting from the tubular member at opposite sides of the ports; and guides at the outer sides of the burners to longitudinally position the blades on the conveyer relative to the burners for the purpose specified.

Signed at New York city, in the county of New York and State of New York this 23rd day of March, 1918.

REINHART W. PITTMAN.